March 24, 1936. A. G. HERRESHOFF 2,034,757
CLUTCH
Filed Jan. 19, 1934
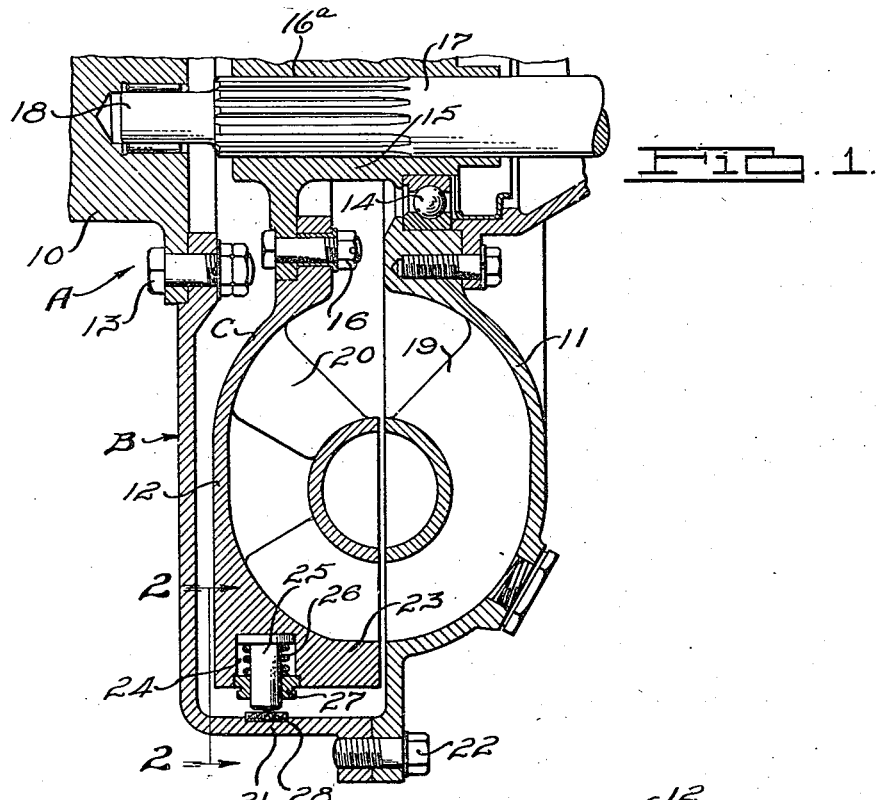
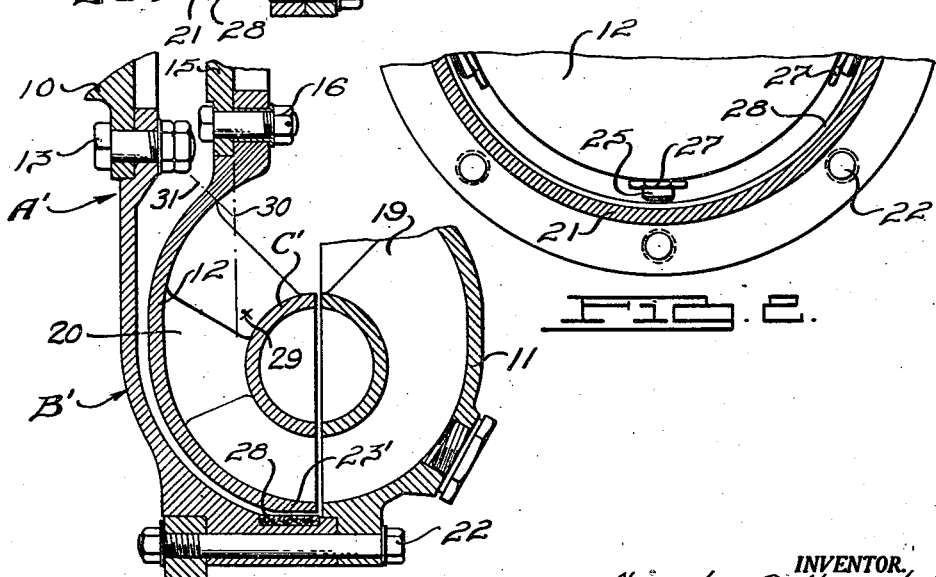
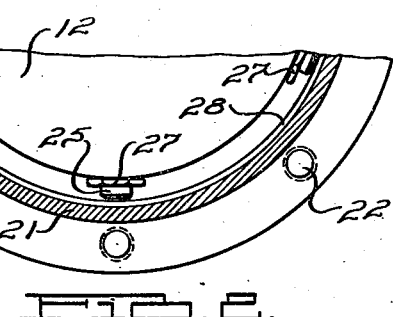
INVENTOR.
Alexander G. Herreshoff
BY
Harness, Lind, Patee & Harris
ATTORNEYS.

Patented Mar. 24, 1936

2,034,757

UNITED STATES PATENT OFFICE 2,034,757

CLUTCH

Alexander G. Herreshoff, Grosse Pointe Village, Mich., assignor to Chrysler Corporation, Detroit, Mich., a corporation of Delaware Application January 19, 1934, Serial No. 707,278

14 Claims. (Cl. 192—48)

This invention relates to clutches and refers more particularly to improvements in fluid clutches.

Heretofore, it has been customary in clutches of the fluid flywheel type to rely on the fluid circulated between the driving and driven clutch vane members to establish the driving connection through the clutch at substantially all speeds of operation thereof, and particularly at relatively high speeds of rotation. At low speeds a certain amount of slipping between the clutch members is ordinarily desirable in smoothly picking up the load between the driving and driven clutch members, and the fluid clutch is of advantage in permitting such slippage without wear usually attendant to more common forms of friction clutches.

Clutches of the aforesaid type may be used to advantage in transmitting power from an engine of a motor vehicle to a speed changing transmission, by way of example, and when so used it is apparent that much of the motor vehicle operation is under conditions of direct drive through the clutch.

My invention has particular significance in connection with motor vehicle clutches of the aforesaid type, although not limited thereto in its broader aspects; one object thereof residing in the provision of means for drivingly connecting the clutch members in addition to the driving connection afforded by the fluid circulated by the clutch.

A further object of my invention resides in the provision of means for increasing the efficiency of fluid type clutches or the like by causing engagement of the clutch members. This engaging means, in the preferred embodiment of my invention, is limited to relatively high speeds of clutch rotation and is preferably of a yielding or slipping character so that slippage of the clutch members may take place, even at high speeds, such conditions being desirable in certain instances of operation of the motor vehicle or other mechanism embodying the clutch.

In carrying out the objects of my invention, I have provided means establishing a frictional engagement for the fluid clutch members, such engagement being responsive to a predetermined speed of rotation of the driving or driven clutch members, preferably the latter. Thus, by way of illustrating my invention, I have provided one or more shoes moved by centrifugal force to establish the aforesaid frictional engagement. In a further illustrated form of my invention, I have provided a friction surface carried by the driving clutch member in the path of the driven member when deflected by the action of centrifugal force at relatively high speeds of rotation.

Further objects and advantages of my invention will be apparent from the following detailed description of several embodiments thereof, reference being had to the accompanying drawing, in which:

Fig. 1 is a sectional elevational view of the lower half of my clutch.

Fig. 2 is a detail view thereof partly in cross section, the view being taken along the line 2—2 of Fig. 1.

Fig. 3 is a sectional elevation view of a portion of my clutch having a modified form of my invention as a part thereof.

Referring to the drawing, I have illustrated one form of my invention in Fig. 1, this view representing a sectional elevational view of the lower half only of my clutch, it being understood that the upper half would be similar. This clutch A is adapted to be driven by the prime mover or engine having a driving shaft 10. The clutch consists of a driving structure B and a driven structure C, these structures being provided with working clutch members or cooperating vane members 11 and 12, respectively. The driving structure B is connected by suitable fasteners 13 with the engine driving shaft 10, and with the illustrated embodiment, this driving structure is adapted to substantially house the driven structure, the driving member 11 rotatably receiving an extended portion of the driven structure by reason of a bearing 14 carried by the hub 15 connected at 16 with the driven member 12. The driving and driven structures are thus rotatable relative to each other and the driven hub 15 is splined at 16a to the power take-off or driven shaft 17, the latter having a forwardly extending portion 18 freely piloted in the drive shaft 10.

The driving and driven members 11 and 12, respectively, are provided with cooperating fluid conducting vanes 19 and 20, these being adapted on rotation of the driving member to cooperate in the usual manner by guiding the fluid outwardly of the driving member and inwardly of the driven member as the fluid is circulated under the influence of centrifugal force in establishing the fluid drive in a manner well understood in the art.

The driving structure B has an annular peripheral portion 21 thereof connected by fasteners 22 to the driving vane member 11, the driven member 12 having a peripheral portion 23 extending annularly within the portion 21 of the driving member and being positioned substantially adjacent thereto, whereby these portions cooperate to provide the aforesaid frictional engagement in response to a predetermined speed of rotation of one of the clutch members, preferably the driven member 12. This frictional engagement is adapted to supplement the fluid drive provided by the vanes of the clutch members.

In Figs. 1 and 2 of my drawing, I have illustrated one form of providing the supplemental engaging means wherein the driven member 12 is provided with a circumferential series of outwardly extending openings 24 in the peripheral portion 23 thereof, said openings each receiving a shoe or plunger element 25 normally urged inwardly by a spring 26, the latter reacting on an abutment 27 threadedly engaging opening 24. This threaded engagement provides for adjustment of the tension of spring 26 in order to vary the rotational speed at which the centrifugal force will cause outward movement of the shoes 25. These shoes extend outwardly through the abutments 27 into close proximity with the annular strip or vane of friction material 28, the latter being connected to and carried by the peripheral portion 21 of the driving structure B. This annular vane 28 may be formed of usual friction material such as is commonly used for brake linings, clutch facings, and so forth.

The springs 26 normally urge the plungers 25 inwardly so as to slightly space the outward extremities of the plungers from the friction material 28, it being understood that when the driven structure C and clutch member 12 thereof are driven at a predetermined desired speed of rotation, the centrifugal force resulting from this rotation will act on plungers 25 so as to move them outwardly into frictional engagement with the band 28, thereby serving to establish a supplemental driving connection between the driving and driven structures. I prefer to provide a frictional engagement of the general character just described, as distinguished from a positive locking engagement, since my frictional engagement is operative without objectionable noises, and furthermore, since the rotational speed controlling the engagement may be readily fixed without requiring any synchronization of the driving and driven members.

Other advantages will also be apparent from my disclosure. It will be noted that after engagement takes place between plungers 25 and the band 28, an increase in the rotational speed of the driven member will serve to correspondingly increase the force applied by plungers 25, whereby the degree of this supplemental engagement is proportional to the rotational speed of the driven structure once the engagement has been established at the predetermined speed, which might be termed the critical speed of rotation of the driven member.

Referring to Fig. 3, I have illustrated a modified form of my invention in which the plungers 25 of Fig. 1 have been omitted, and in which the driven member is so arranged and supported as to cause deflection or distortion of a portion thereof from its normal shape under the influence of centrifugal force in order to establish the supplemental frictional engagement. Inasmuch as the major portions of the clutch A' shown in Fig. 3 are similar in general construction and operation to the corresponding parts shown in Fig. 1, I have indicated such parts of Fig. 3 with the same reference numerals as applied to Fig. 1, and such parts will not require further detailed description or explanation. In Fig. 3, the annular peripheral portion 23' of the driven clutch member 12 is adapted, in itself, to distort or deflect into engagement with the friction band 28, so as to cause the supplemental driving engagement between the driving and driven structures B' and C', respectively, of Fig. 3. In order to further assist in the deflection or distortion to cause the aforesaid supplemental engagement at the desired speed of rotation of the driven shaft 12, it will be noted that this driven member may, if desired, be supported by the fasteners 16 so that the center of mass 29 of the driven member overhangs the support in plane 30 in a direction longitudinally of the axis of rotation of the driven structure. In other words, the center of mass of the driven member is spaced axially of the said axis of rotation from the support for the driven member, the centrifugal force thereby acting at the center of mass to bodily deflect or distort the driven member from its normal shape, and thereby cause the peripheral portion 23' of the driven member to frictionally engage the band 28, the amount or degree of this engagement being in proportion to the speed of rotation of the driven member above the critical speed, as in the case of Fig. 1.

If desired, the driven member C' may have a suitable part or parts thereof deliberately weakened so that the aforesaid distortion will be facilitated, it being apparent that after sufficient distortion occurs to cause the supplemental engagement further distortion of the driven member is prevented by reason of the engagement with the driving structure B'.

In Fig. 3 the center of mass of the driven clutch member 12 is designated approximately at 29. It will be noted that the region of greatest bending stress in member 12 occurs approximately at the zone indicated at 31 so that as long as the center of mass 29 is located to the right of zone 31, with the parts arranged as illustrated, the annular peripheral portion 23' will tend to be displaced toward the friction surface 28. This permits a wide latitude in the location of the center of mass.

In both illustrated embodiments of my invention the load is taken up by the fluid medium and the supplemental engagement comes in at a predetermined relatively high speed to substantially lock the clutch parts together.

While I have shown for the purpose of illustration several embodiments of my invention, I desire to point out that I do not limit my invention as defined by the appended claims to the particular combination and arrangement of parts described and illustrated, since further forms will be apparent from the teachings of my invention.

What I claim is:

1. In a fluid clutch, driving and driven structures, each of said structures having fluid guiding vanes for establishing a drive therebetween, one of said structures being housed within the other, and means frictionally connecting said structures at a predetermined speed of rotation of one of said structures, said means including a friction surface carried by one of said structures and located in the path of the other of said structures when the latter is deflected from its normal shape under the influence of centrifugal force.

2. In a clutch of the fluid type, a driving structure, a driven structure adapted to receive the drive from the driving structure through a fluid medium, one of said structures providing a housing for the other, and driving means supplementing said fluid drive, said means including an element slidably carried by one of said structures and moved outwardly of the axis of rotation thereof in response to centrifugal force for engaging the other of said structures.

3. In a clutch of the fluid type, a driving structure, a driven structure adapted to receive the drive from the driving structure through a fluid medium, and driving means supplementing said fluid drive, said means including a plunger slidably carried by one of said structures and moved in response to a predetermined speed of rotation thereof.

4. In a clutch of the fluid type, a driving structure, a driven structure adapted to receive the drive from the driving structure through a fluid medium, one of said structures having a portion thereof housing the other of said structures and spaced therefrom, and yielding driving means supplementing said fluid drive, said means including an element carried by one of said structures and moved in response to rotation thereof across said space into engagement with the other of said structures.

5. In a clutch of the fluid type, a driving structure, a driven structure adapted to receive the drive from the driving structure through a fluid medium, one of said structures having a portion thereof adapted for engagement with the other when the latter is deflected under the influence of centrifugal force.

6. In a clutch of the fluid type, a driving structure, a driven structure adapted to receive the drive from the driving structure through a fluid medium, one of said structures having a portion thereof adapted to yieldingly move in response to rotation thereof, the other of said structures having a portion adapted for engagement with said first portion in response to distortion of said structure which has said yielding portion.

7. In a fluid clutch, driving and driven members, said members having vanes cooperating with each other to provide fluid circulating passages, one of said members being distorted in response to rotation thereof for engagement with the other.

8. In a fluid clutch, driving and driven members, said members having vanes, cooperating with each other to provide fluid circulating passages, one of said members being distorted in response to centrifugal force acting thereon for engagement with the other.

9. In a clutch, driving and driven members, said members having vanes cooperating with each other to provide fluid circulating passages, one of said members being bodily distorted in response to rotation thereof for engagement with the other.

10. In a clutch, driving and driven structures, driving and driven members respectively carried by said driving and driven structures, said members having cooperating fluid conducting vanes acting in response to rotation of said driving structure to establish a drive between said members, said driving structure having a peripheral portion thereof adapted to house the outer portion of said driven member, and means responsive to a predetermined speed of rotation of said driving member for causing said driven member to frictionally engage said peripheral portion of said driving structure to supplement said fluid drive.

11. In a clutch, driving and driven structures, driving and driven members respectively carried by said driving and driven structures, said members having cooperating fluid conducting vanes acting in response to rotation of said driving structure to establish a drive between said members, said driving structure having a peripheral portion thereof adapted to house the outer portion of said driven member, and means responsive to a predetermined speed of rotation of said driving member for causing said driven member to frictionally engage said peripheral portion of said driving structure to supplement said fluid drive, said frictional engaging means including an annular band of friction material carried by said peripheral portion of said driving structure.

12. In a clutch of the fluid type, coaxial relatively rotatable driving and driven shafts, a member drivingly mounted on each of said shafts, each of said members having a plurality of vanes adapted to provide fluid circulating passages for establishing a fluid drive between said members, and means for drivingly mounting one of said members on one of said shafts with the center of mass thereof spaced axially and radially from said mounting whereby said member will be distorted from its normal shape to engage the other of said members in response to centrifugal force.

13. In a clutch of the fluid type, coaxial relatively rotatable driven and driving shafts, a runner structure having a plurality of fluid conducting passages, an impeller structure having a plurality of fluid conducting passages adapted to cooperate with said passages of the runner structure to provide a fluid drive between said structures, means for mounting said structures on said shafts respectively, said mounting means for one of said structures being offset in the direction of the axis of rotation thereof from the center of mass of said structure whereby the latter will bodily distort in response to centrifugal force acting thereon, the other of said structures having a portion thereof normally free from contact with said distortable structure but adapted for engagement therewith at a predetermined speed of rotation of said distortable structure.

14. In a fluid coupling, driving and driven vane forming structures, one of said structures being housed within the other, said inner structure having a substantially cup-shaped vane forming portion carrying a centrifugal force displaceable peripheral clutching part adapted for frctional engagement with said outer housing structure.

ALEXANDER G. HERRESHOFF.